United States Patent
Baccouche et al.

(10) Patent No.: US 8,186,752 B2
(45) Date of Patent: May 29, 2012

(54) VEHICLE BODY STRUCTURE

(75) Inventors: Mohamed Ridha Baccouche, Ann Arbor, MI (US); Saied Nusier, Canton, MI (US); Saeed David Barbat, Farmington Hills, MI (US); Hikmat F. Mahmood, Bloomfield Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 338 days.

(21) Appl. No.: 12/408,386

(22) Filed: Mar. 20, 2009

(65) Prior Publication Data

US 2010/0237661 A1 Sep. 23, 2010

(51) Int. Cl.
*B62D 25/04* (2006.01)

(52) U.S. Cl. .................................. 296/203.01

(58) Field of Classification Search .................. 296/210, 296/193.06, 203.01, 205, 102
See application file for complete search history.

(56) References Cited

U.S. PATENT DOCUMENTS

| | | | | |
|---|---|---|---|---|
| 2,071,449 | A * | 2/1937 | Accardi | 296/203.01 |
| 4,350,367 | A * | 9/1982 | Kolb et al. | 280/756 |
| 5,458,393 | A * | 10/1995 | Benedyk | 296/203.01 |
| 6,092,865 | A * | 7/2000 | Jaekel et al. | 296/205 |
| 6,241,310 | B1 * | 6/2001 | Patelczyk | 296/205 |
| 6,273,498 | B1 * | 8/2001 | Hillman et al. | 296/203.01 |
| 6,332,643 | B1 | 12/2001 | Sukegawa et al. | |
| 6,623,067 | B2 * | 9/2003 | Gabbianelli et al. | 296/205 |
| 6,957,845 | B2 * | 10/2005 | Rager | 296/146.9 |
| 7,121,615 | B2 | 10/2006 | Hoshino | |
| 7,152,914 | B2 | 12/2006 | Dingman et al. | |
| 7,251,915 | B2 * | 8/2007 | Zimmerman et al. | 52/239 |
| 7,357,448 | B2 * | 4/2008 | Chen et al. | 296/203.03 |
| 7,410,210 | B2 * | 8/2008 | Park | 296/210 |
| 7,585,017 | B2 * | 9/2009 | Zimmerman et al. | 296/193.06 |
| 7,765,699 | B2 * | 8/2010 | Corcoran et al. | 29/897.2 |
| 2002/0185892 | A1 * | 12/2002 | Rima et al. | 296/203.01 |
| 2006/0255624 | A1 * | 11/2006 | Zimmerman et al. | 296/193.06 |
| 2006/0273630 | A1 | 12/2006 | Chen et al. | |
| 2007/0108803 | A1 | 5/2007 | Chen et al. | |
| 2007/0257517 | A1 * | 11/2007 | Day et al. | 296/193.06 |
| 2008/0111398 | A1 * | 5/2008 | Stojkovic et al. | 296/203.01 |
| 2009/0071737 | A1 * | 3/2009 | Leonard et al. | 180/68.4 |
| 2010/0194147 | A1 * | 8/2010 | Aul et al. | 296/193.06 |
| 2010/0263954 | A1 * | 10/2010 | Constans | 180/89.12 |

* cited by examiner

*Primary Examiner* — H Gutman
(74) *Attorney, Agent, or Firm* — Gigette Bejin; Fredrick Owens

(57) ABSTRACT

A vehicle body structure having improved roof support characteristics is provided. The structure includes a roof rail integral to an A-pillar and a support pillar. The structure further includes a cross member. The A-pillar includes an inner surface, an outer surface, and a wall therebetween. The roof rail extends downwardly at a front end of the roof rail and extends downwardly at a rear end of the roof rail. The roof rail is integral to a one piece hollow A-pillar at the front end of the roof rail. The support pillar also includes an inner surface, an outer surface, and a wall therebetween. The support pillar also includes a tubular lower section that extends upwardly from the rocker. The upper section of the support pillar is integral to the rear end of the roof rail.

3 Claims, 4 Drawing Sheets

VEHICLE BODY STRUCTURE

TECHNICAL FIELD

The present disclosure generally relates to a vehicle roof support body structure.

BACKGROUND OF THE INVENTION

Roof support pillars support the roof of a vehicle and are located between the windows and doors of a vehicle. Roof support pillars are frequently identified as A, B, C, and in some instances, D-pillars depending on the vehicle style. A B-pillar is generally located immediately behind the front door of a vehicle, and extends from a floor pan and rocker panel upward to a vehicle roof. The B-pillar is an element in determining roof strength and the degree of side impact intrusion. The B-pillar may also be subjected to loads exerted on the doors in a vehicle side impact scenario.

Passenger vehicle designs are tested for roof strength and side impact strength. Conventional B-pillars are fabricated as multiple stamped sheet metal parts that are generally spot welded together. It is possible to improve the strength of conventional B-pillars by forming the sheet metal parts from high grade material, such as dual phase and boron steels. B-pillars may also be made stronger by using thicker gauge sheet metal components. However, the use of high strength alloys and thicker sheet metal may increase the weight of a vehicle and also increase the cost to manufacture the B-pillar. Even with the use of thicker alloy components, B-pillars of conventional design may not always meet stringent test requirements for roof strength and side impact performance.

Although stamped members have been used in vehicle body structures for many years, hydroformed components or members may be used in vehicles. Hydroforming is a cost-effective way of shaping malleable metals into lightweight, structurally stiff and strong pieces. Non-limiting examples of non-malleable metals includes aluminum or steel. One of the largest applications of hydroforming is the automotive industry, which makes use of complex shapes possible by hydroforming to produce stronger, lighter and more rigid unibody structures for vehicles. This technique is also popular with the high-end sports car industry, and is also frequently used to shape aluminum tubes for bicycle frames.

Hydroforming allows complex shapes to be formed, which would be difficult to manufacture with standard solid die stamping. Furthermore, hydroformed parts can often be made with a higher stiffness to weight ratio and at a lower per unit cost than traditional stamped or stamped and welded parts.

Referring now to the drawings wherein like reference numerals are used to identify identical components in the various views, FIGS. 1 and 2 show a prior art hydroformed body structure 100 where the C-Pillar 114 is integral to a roof side rail 118 and the A-pillar 123. Accordingly, with the use of the hydroforming process, the A-pillar 123, the roof side rail 118, and the C-Pillar 114 are formed from a single member. Moreover, the traditional structure includes at least one stamped cross member 130 at the roof structure 112 of the vehicle (not shown).

The traditional hydroformed body structure design 100 of FIGS. 1 and 2 anchor the roof rail 118 at the C-Pillar 114 given that the C-Pillar 114, the roof rail 118 and the A-pillar 123 are formed from a single member through the hydroforming process. The B-pillar 116 is typically a stamped member 117 and deforms prior to C-pillar 114 when the vehicle (not shown) experiences significant loads at the roof structure 112 as shown in FIG. 3.

SUMMARY

A vehicle body structure having improved roof support is provided according to the embodiments disclosed herein. The structure includes a roof rail having an inner surface, an outer surface, and a wall therebetween. The roof rail extends downwardly at a front end of the roof rail and extends downwardly at a rear end of the roof rail. The roof rail is integral to a hollow A-pillar at the front end. The roof rail is also integral to a support pillar also having an inner surface, an outer surface, and a wall therebetween. The support pillar includes a tubular lower section that extends upwardly from a rocker. The support pillar is integral to the rear end of the roof rail at the upper portion of the support pillar.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION OF THE PREFERRED EMBODIMENT

The present disclosure provides an improved vehicle body structure 10 which can withstand greater roof loads 13 with reduced displacement of the roof structure 12.

Figure 1:
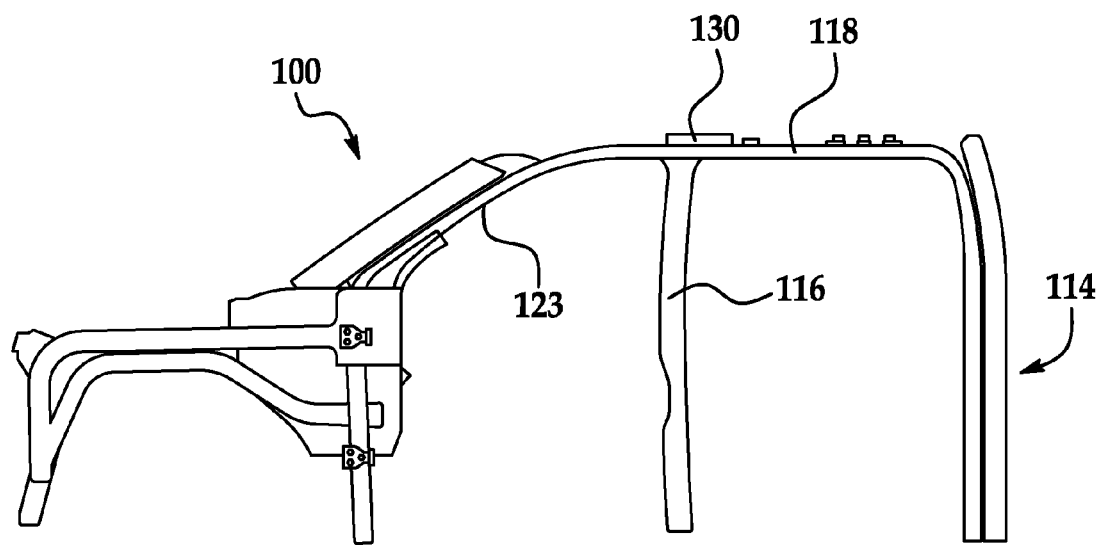
FIG. 1 shows a prior art partial side view schematic image of a vehicle body structure having a stamped B-pillar.
Figure 2:
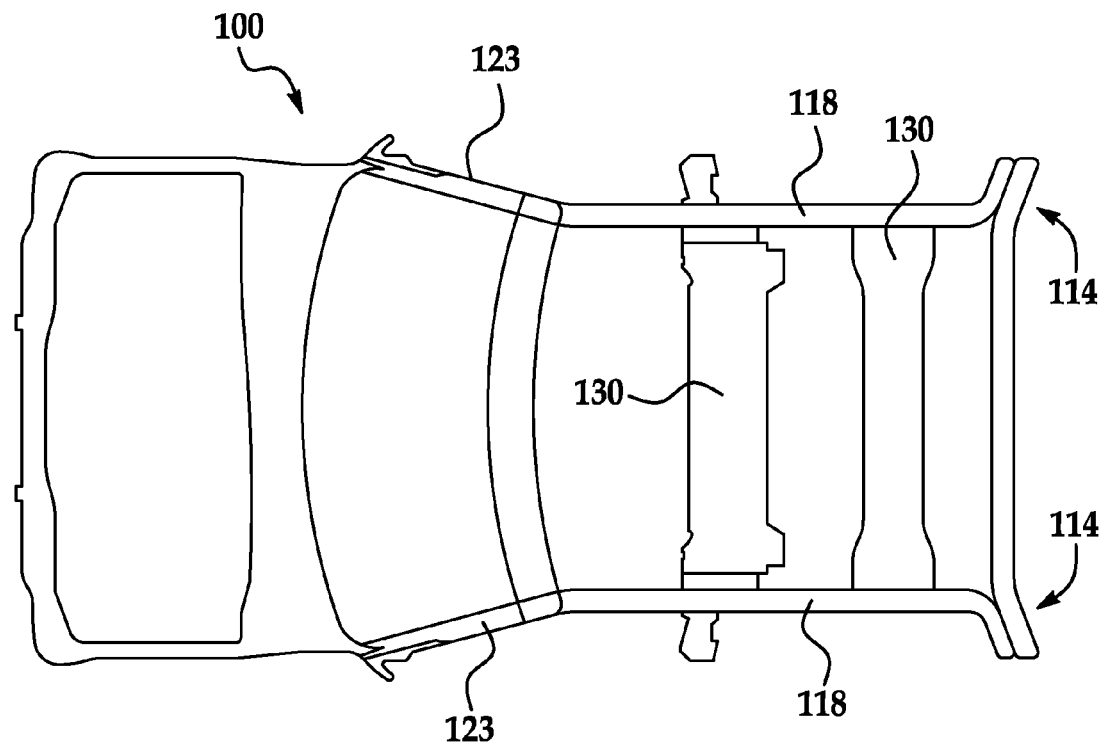
FIG. 2 shows a prior art partial top view image of a vehicle body structure having a roof bow and brackets.
Figure 3:
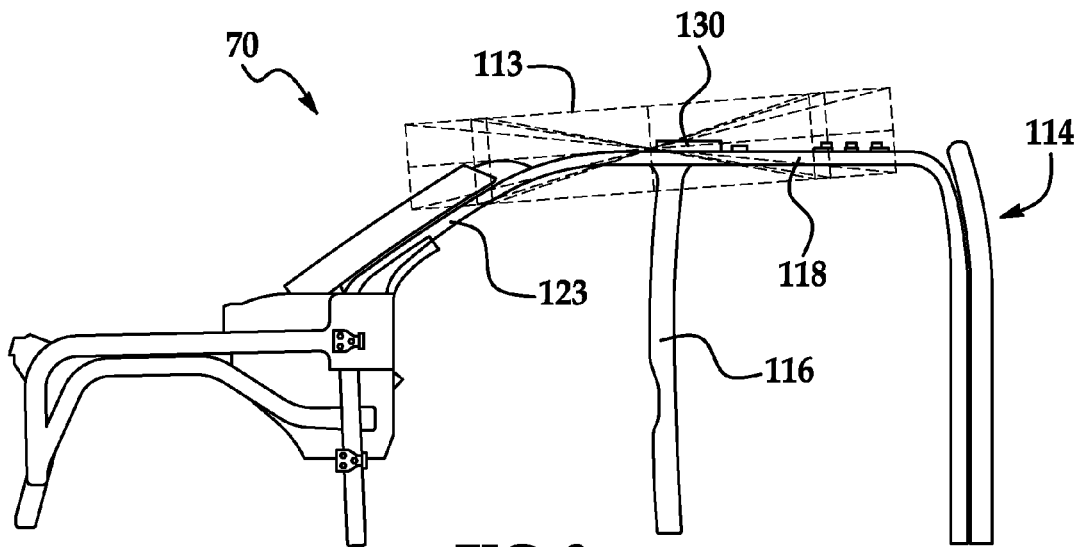
FIG. 3 shows a free body diagram of a prior art vehicle body design wherein the shearing and pulling of C-pillar and roof side rails is illustrated.

Referring to FIG. 3, when a significant load is imposed on a roof structure 12, the C-Pillar 14 has a tendency to shear and pull away from the vehicle and the vehicle centerline 67 (shown in FIG. 5) given that the roof rail is integral to the C-Pillar 14 and the roof rail 20 is anchored at the C-Pillar 14 near the rear 11 of the vehicle (not shown). With reference to the non-limiting example data shown in FIG. 6, a displacement of approximately 4 inches may occur to the roof structure 12 that is anchored at the C-Pillar 14 (as shown in FIG. 3) when a 15000 lb load is applied to the roof structure 12.

Accordingly, the inventors of the present disclosure have discovered a new and useful hydroformed body structure 10 wherein the roof loads 13 are primarily supported at the B-Pillar 16. The body structure 10 of the present disclosure can withstand much higher loads with reduced roof displacement while maintaining the benefits of implementing hydroformed members—high stiffness to weight ratio, lower cost per unit. The vehicle body structure 10 disclosed herein substantially and advantageously overcomes at least the potential drawbacks noted above.

Referring now to FIGS. 4, 5, 9 and 10 together, a first embodiment of the present disclosure is shown. The vehicle body structure 10 includes a roof rail 18 having an inner surface 48, an outer surface 50, and a wall 52 therebetween. The roof rail 18 extends downwardly at a front end 38 of the roof rail 18. The roof rail 18 also extends downwardly at a rear end 40 of the roof rail 18. The roof rail 18 is integral to a hollow A-Pillar 24 at the front end 38. The roof rail 18 is also integral to a hollow support pillar 34 having an inner surface 48, an outer surface 50, and a wall 52 therebetween. The hollow support pillar 34 includes a tubular lower section 53 that extends upwardly from the rocker 56 or a rocker member. The support pillar 34 is integral to the rear end 40 of the roof rail 18 at the upper portion of the support pillar 34.

Figure 5:
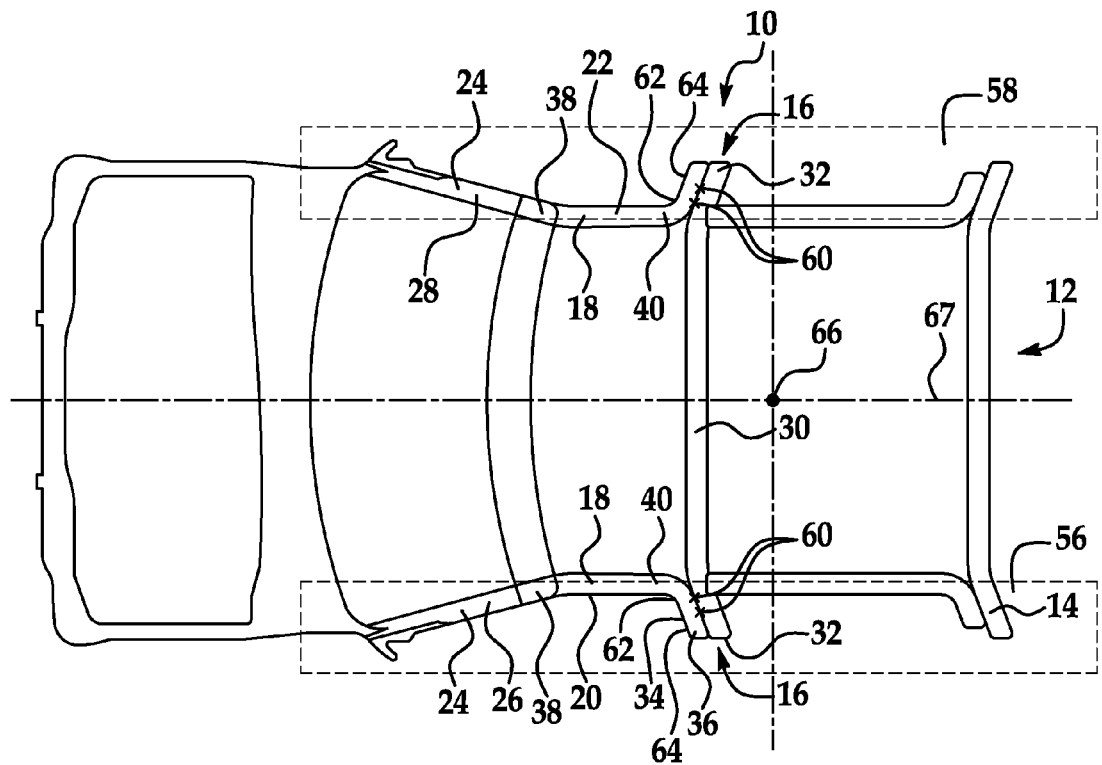
FIG. 5 shows a partial top view of a first embodiment of the present disclosure.
Figure 6:
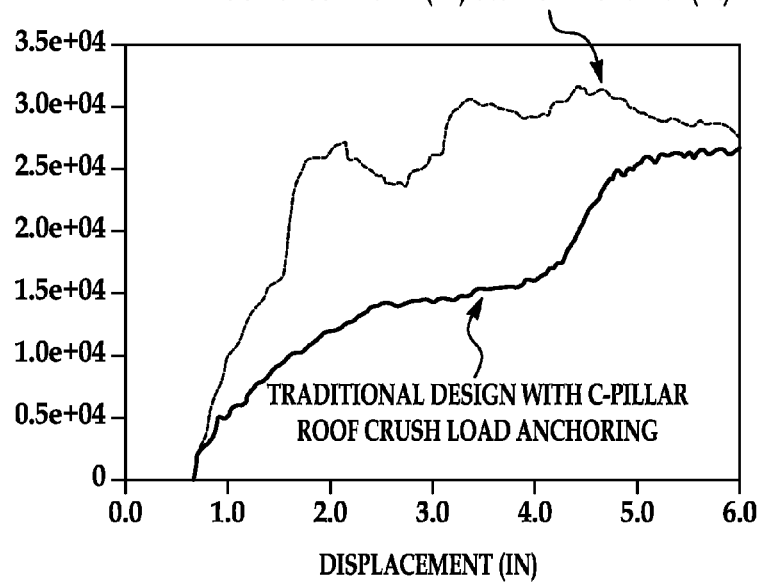
FIG. 6 shows an example of testing data obtained in a graph form wherein the difference between a force-deformation responses of a prior art design and the present disclosure is illustrated.
Figure 7:
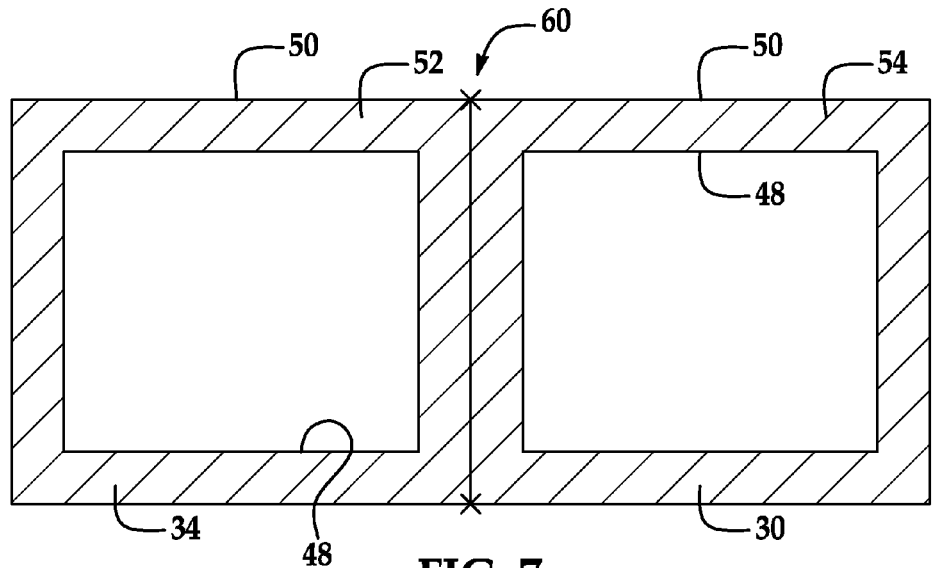
FIG. 7 shows a cross section along lines A-A in FIG. 4.

With reference to FIGS. 4-8, a second embodiment, a second embodiment is illustrated where the support pillar 34 may also be adjacent to a cross member 30. The addition of a cross member 30 further improves vehicle stiffness. The cross member 30, like the support rail 34/roof rail 18/A-Pillar 24 is hollow in construction as shown in FIG. 7. The cross member 30 includes an inner surface 48, an outer surface 50 and a wall 52 therebetween. The cross member 30 may also be manufactured using a hydroforming process. As shown the cross member 30 extends from the first rocker 56, to the roof structure 12 and then in a direction that is transverse to the vehicle (not shown), and terminates at the second rocker 58 of the vehicle.

The support pillar 34 may be welded to at least a portion of the cross member 30 along the length of the cross member 30 proximate to a first end 32 of the cross member 30. The welding of the support pillar 34 and the cross member 30 may also be along the length of the cross member 30 where the cross member 30 is adjacent to the support pillar 34. A non-limiting example for welding the cross member 30 and the support pillar 34 may be stitch welding. It is to be understood, however, that various joining methods may be used in addition to welding in general, such as, but not limited to, mechanical fasteners (not shown) and adhesives (not shown).

Figure 4A:
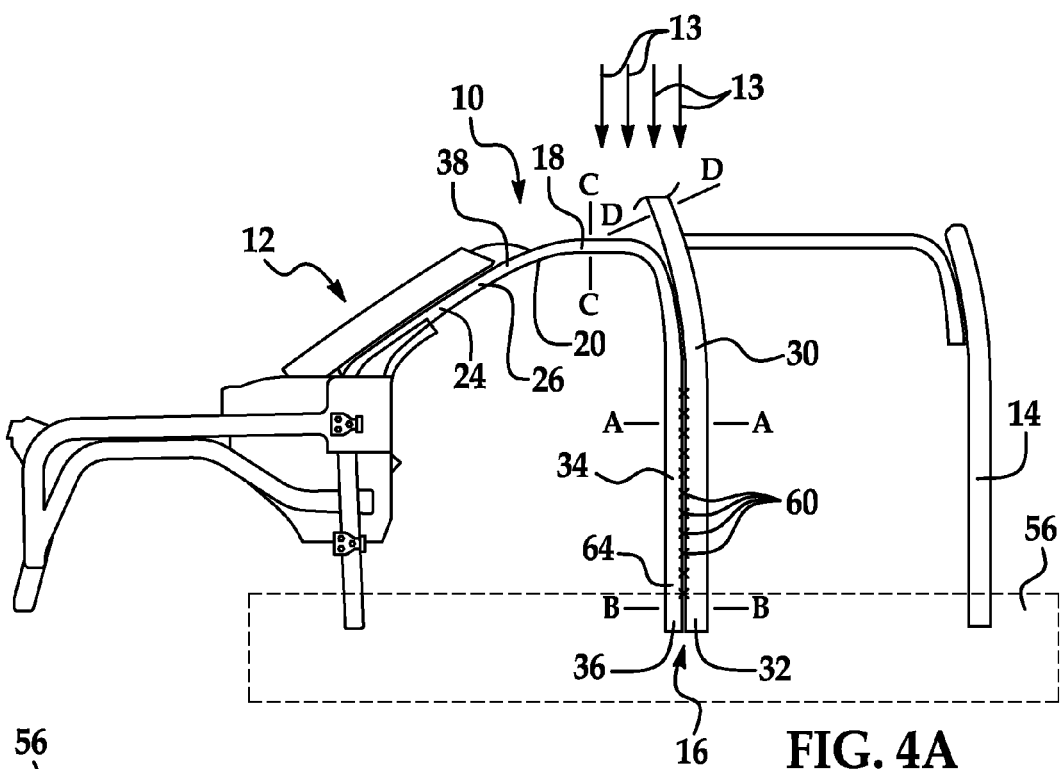
FIG. 4A shows a partial side view schematic image of a first embodiment of the present disclosure.
Figure 4B:
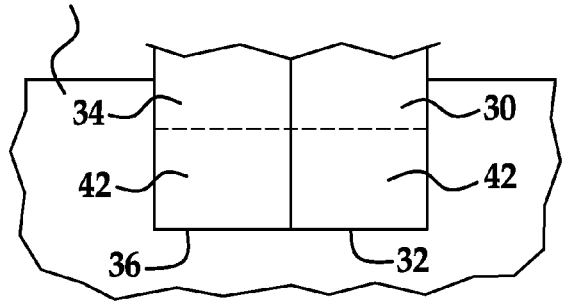
FIG. 4B shows an enlarged, partial side view of the joint between a rocker, a support pillar a the cross member of the present disclosure.
Figure 8:
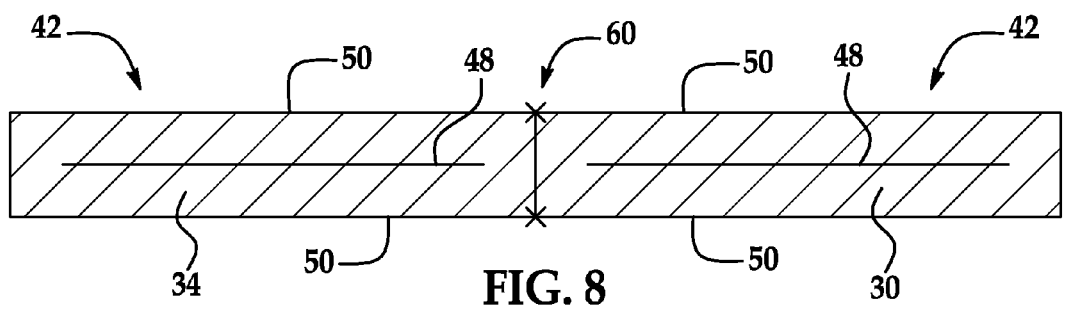
FIG. 8 shows a cross-section along lines B-B in FIG. 4.

Referring now to FIGS. 4A, 4B, and 8, the rocker end 36 of the support pillar 34 and the end 32 of the cross member 30 may be compressed together to define rocker flanges 42 at the rocker ends 36 of the support pillar 34 (on each side of the vehicle) and each end 32 of the cross member 30. The rocker flanges 42 of the support pillars 34 and the cross member 30 may be operatively configured to receive the first rocker 56 (as shown in FIG. 4B) and the second rocker 58. The rocker flanges 42 and the ends 32 of the cross member 30 are operatively configured to join the support pillar 34 and cross member end to its corresponding rocker 56, 58.

Figures 9, 10:
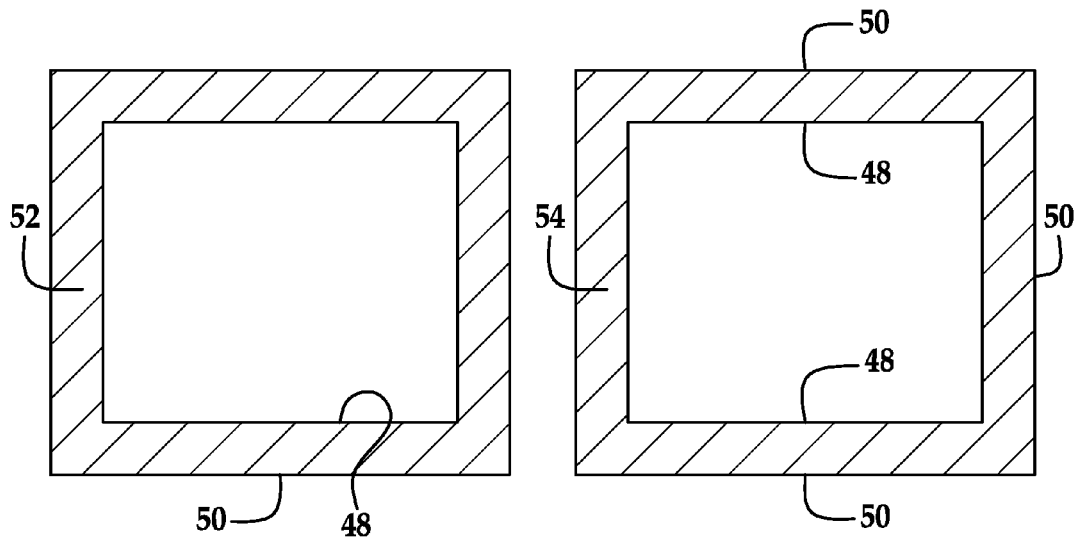
FIG. 9 shows a cross-section along lines C-C in FIG. 4.
FIG. 10 shows a cross-section along lines D-D in FIG. 4.

Referring to FIGS. 4, 5 and 9 together, the body structure 10 of the present disclosure includes a first roof rail 20 of a vehicle (not shown) having an inner surface 48 and an outer surface 50 with a wall 52 therebetween. The first roof rail 20 extends downwardly at a first front end 38 of the first roof rail 20. The first roof rail 20 also extends downwardly at a first rear end 40 of the first roof rail 20. The first roof rail 20 is integral to a hollow first A-Pillar 26 at the first front end 38 as shown in FIG. 4. The vehicle body structure 10 may further include a first rocker 56 member and a second rocker 58 member as shown in FIG. 5.

The hollow first support pillar 34 includes an inner surface 48, an outer surface 50 and a wall 52 therebetween. The first support pillar 34 includes a tubular lower section 53 that extends upwardly from the first rocker 56. The first support pillar 34 also includes an upper section 62 which, as indicated, is integral to the rear end 40 of the first roof rail 20.

With reference to FIG. 5, it is to be understood that, In addition to a first roof rail 20, a second roof rail 22 is provided where the second roof rail 22 includes an inner surface 48 and an outer surface 50 with a wall 52 therebetween. The second roof rail 22 extends downwardly at a second front end 38 of the second roof rail 22 to form the second A-Pillar 28. The second roof rail 22 also extends downwardly at a second rear end 40 of the second roof rail 22 to form the second B-Pillar 16. As shown in FIG. 4, the second roof rail 22 is integral to a hollow second A-Pillar 28 and the second B-Pillar 16. The second roof rail 22, the second A-Pillar 28 and the second B pillar are a single member and may be formed using a hydroforming process.

As shown in FIGS. 4, 5, and 7, a hollow second support pillar 34 is disposed adjacent to at least a portion of a cross member 30 proximate to the having an inner surface 48, an outer surface 50 and a wall 52 therebetween. The second support pillar 34 includes a tubular lower section 64 that extends upwardly from the second rocker 58. The second support pillar 34 includes an upper section 62 integral to the rear end 40 of the second roof rail 22. Similar to the roof rail 38/A-pillar 24/support pillar 34, the hollow cross member 30 includes an inner surface 48, an outer surface 50 and a wall 52 therebetween as shown in FIG. 7.

The cross member 30 extends upwardly from the first rocker 56 at a first end 32 of the cross member 30. The first end 32 of the cross member 30 may be adjacent to or proximate to the first support pillar 34. The cross member 30 further includes another end 32 wherein the end 32 of the cross member 30 is adjacent to or proximate to the second support pillar 34. The cross member 30 extends upwardly from the second rocker 58 at the end 32 of the cross member 30. As shown in FIG. 5, the cross member 30 extends in a transverse vehicle direction between each end 32 of the cross member 30.

It is to be understood that the first support pillar 34 is welded to at least a portion of the cross member 30 along the length of the first support pillar 34 and the cross member 30 where the first support pillar 34 and the cross member 30 are adjacent to one another near the first end 32 of the cross member 30. A non-limiting example of a welding process may be stitch welding 60. However, other joining techniques may be used such as mechanical fasteners (not shown) or adhesives (not shown).

It is to be understood that the second support pillar 34 is welded to at least a portion of the cross member 30 along the length of the second support pillar 34 and the cross member 30 where the second support pillar 34 and the cross member 30 are adjacent to one another near the end 32 of the cross member 30. As indicated, a non-limiting example of a welding process may be stitch welding 60. However, as previously indicated, other joining techniques may be used such as mechanical fasteners (not shown) or adhesives (not shown).

In order to join a rocker 56, 58 to its corresponding support pillar 34 and cross member 30, a rocker flange 42 may be defined in the support pillar 34 and in the cross member 30.

The rocker end 36 of the first support pillar 34 may be compressed together to define a first rocker flange 42. The rocker flange 42 further includes a spot weld flange 44 is operatively configured to join the first support pillar 34 and the first rocker 56.

Similar to the support pillar 34, the ends 32 of the cross member 30 may be compressed together to define a rocker flange 42. Like the rocker flange 42 of the support pillar 34, the rocker flange 42 of the cross member 30 may further includes a spot weld flange 44 being operatively configured to join the cross member 30 and the rocker 56.

As shown in FIGS. 4, 5, and 7, the dual tube construction in the B-Pillar 16 area allows the vehicle structure 10 to withstand greater roof loads 13 with reduced displacement. The B-pillar 16 unlike the C-pillar 14 is placed closer to the longitudinal center 66 of the vehicle (not shown). Accordingly, the roof rails 18 are more resistant to shearing away from the vehicle (not shown).

As shown as a non-limiting example data in the graph of FIG. 6, loads as high as 30,000 lbs may be incurred on the vehicle body structure 10 of the present disclosure before the vehicle (not shown) experiences 4 inches of displacement. This equates to approximately twice the roof load capability as the traditional design as shown in the graph of FIG. 6.

While multiple embodiments of the present disclosure have been described in detail, it will be apparent to those skilled in the art that the disclosed embodiments may be modified. Therefore, the foregoing description is to be considered exemplary rather than limiting.

What is claimed is:

1. A vehicle body structure having improved roof support characteristics, the vehicle body structure comprising:
   a first roof rail and a second roof rail each having an inner surface and an outer surface, each of the first and second roof rails extending downwardly at the front end of each of the first and second roof rails and extending downwardly at a rear end of each of the first and second roof rails each being integral to a one piece hollow A-pillar at the front end;
   a first rocker and a second rocker;
   a first hollow support pillar and a second hollow support pillar each having an inner wall, an outer wall, each of the first and second support pillar having a tubular lower section that extends upwardly from each of the first and second rockers and an upper section integral to the rear end of the roof rail; and
   a cross member having a first end and a second end, the cross member extending upwardly from the first rocker at the first end and extending upwardly from the second rocker at the second end, the cross member being affixed to the first and second roof rails at each of the tubular lower sections, the cross member and the first and second roof rails operatively configured to support a B-Pillar roof load.

2. The vehicle body structure as defined in claim 1 wherein the cross member extends in a transverse vehicle direction between the first end and the second end of the cross member.

3. The vehicle body structure as defined in claim 1 wherein the support pillar is welded to at least a portion of the cross member proximate the first end of the cross member.

* * * * *